US011190080B2

(12) United States Patent
Lin

(10) Patent No.: US 11,190,080 B2
(45) Date of Patent: Nov. 30, 2021

(54) CEILING FAN MOTOR HOUSING WITH L-SHAPED POSITIONING MEMBER WITH HORIZONTAL PORTION TO SUPPORT BOTTOM END OF COVER

(71) Applicant: Kuo-Tsun Lin, Taichung (TW)

(72) Inventor: Kuo-Tsun Lin, Taichung (TW)

( * ) Notice: Subject to any disclaimer, the term of this patent is extended or adjusted under 35 U.S.C. 154(b) by 71 days.

(21) Appl. No.: 16/587,446

(22) Filed: Sep. 30, 2019

(65) Prior Publication Data

US 2021/0099048 A1 Apr. 1, 2021

(51) Int. Cl.
*H02K 5/26* (2006.01)
*F04D 25/08* (2006.01)
*H02K 9/00* (2006.01)
*F16B 35/00* (2006.01)
*F04D 25/06* (2006.01)
*H02K 9/06* (2006.01)

(52) U.S. Cl.
CPC ............. *H02K 5/26* (2013.01); *F04D 25/088* (2013.01); *H02K 9/00* (2013.01); *F04D 25/06* (2013.01); *F04D 25/08* (2013.01); *F16B 35/00* (2013.01); *H02K 9/06* (2013.01)

(58) Field of Classification Search
CPC .. H02K 5/26; H02K 5/00; H02K 5/04; H02K 9/06; F04D 25/088; F04D 25/08; F04D 25/06; F16B 35/00
USPC .................................. 310/91, 89, 88, 62, 64
See application file for complete search history.

(56) References Cited

U.S. PATENT DOCUMENTS 3,519,858 A * 7/1970 Morganson ........... B23B 45/008 310/47
4,391,570 A * 7/1983 Stutzman .............. F04D 25/088 417/353
4,505,031 A * 3/1985 Colwell ............... H02K 5/1677 29/596
4,692,096 A * 9/1987 Yang ................... F04D 25/0646 416/170 R
4,897,571 A * 1/1990 Isozumi .................. F02N 11/00 310/239
(Continued)

FOREIGN PATENT DOCUMENTS

CN 201243233 Y 5/2009
CN 201541420 U 8/2010
(Continued)

OTHER PUBLICATIONS

JPS61164439A English Translation.*
(Continued)

*Primary Examiner* — Maged M Almawri

(57) ABSTRACT

A ceiling fan motor housing includes a bottom cover member, a hollow housing member, and a plurality of screws. The bottom cover member is formed with a plurality of threaded holes. The housing member is formed with a plurality of L-shaped positioning members extending from a bottom end thereof. Each of the positioning members has a vertical portion which is connected to the bottom end of the housing member and a horizontal portion which extends inwardly from a bottom end of the vertical portion, supports the bottom cover member, and is formed with a positioning hole. The screws respectively extend through the positioning holes of the positioning members to respectively engage the threaded holes of the bottom cover member.

2 Claims, 3 Drawing Sheets

(56) References Cited

U.S. PATENT DOCUMENTS 5,069,601 A * 12/1991 Shawcross ............ F04D 25/088 417/360
5,200,658 A * 4/1993 Kohno .................... H02K 1/17 310/154.15
5,742,108 A * 4/1998 Kuribayashi ............ H02K 5/20 126/307 R
5,760,513 A * 6/1998 Morishita ................ H02K 5/00 29/596
5,861,694 A * 1/1999 Niemela .................. H02K 1/17 310/89
5,883,449 A * 3/1999 Mehta ...................... H02K 5/20 310/60 R
5,900,686 A * 5/1999 Tabata ................... H02K 29/08 310/71
5,932,942 A * 8/1999 Patyk ..................... H02K 11/33 310/58
5,952,751 A * 9/1999 Yamakoshi ............. H02K 5/04 310/89
6,037,726 A * 3/2000 Tabata .................. B60L 3/0023 318/139
6,400,051 B1 * 6/2002 Hsieh ....................... H02K 5/15 310/261.1
6,589,018 B2 * 7/2003 Chen ..................... F04D 29/263 310/71
6,740,992 B2 * 5/2004 Nadeau ................. F16F 15/067 310/51
6,844,641 B1 * 1/2005 Horng ................... F04D 29/526 310/89
9,385,572 B2 * 7/2016 Lu .......................... H02K 21/22
9,995,315 B2 * 6/2018 Yang ..................... F04D 29/646
10,173,715 B2 * 1/2019 Hayashi ................... H02K 9/22
10,177,632 B2 * 1/2019 Miyajima ............ H02K 11/215
10,641,291 B2 * 5/2020 Jones .................. F04D 25/0693
10,848,042 B2 * 11/2020 Beyerl ................... H02K 11/33
2002/0050759 A1 * 5/2002 Shiraki .................. H02K 5/145 310/239
2004/0183386 A1 * 9/2004 Kuwert .................... H02K 3/50 310/89
2006/0175906 A1 * 8/2006 Hino ...................... G09B 23/18 310/1
2006/0238059 A1 * 10/2006 Komatsu .................. H02K 1/14 310/162
2008/0203837 A1 * 8/2008 Tang .................... H02K 1/2786 310/89
2009/0015111 A1 * 1/2009 Chen ...................... H02K 11/22 310/68 B
2013/0076213 A1 * 3/2013 McCloud ................. H02K 5/00 310/75 D
2013/0209293 A1 * 8/2013 Kawano ................ F04D 25/088 417/423.7
2014/0284183 A1 * 9/2014 Wolters .................. B65G 23/08 198/788
2016/0021765 A1 * 1/2016 Yu ............................ H02K 5/20 310/68 D
2016/0218596 A1 * 7/2016 Hayashi ................... B62D 5/04
2017/0141639 A1 * 5/2017 Yao ...................... H02K 1/2786
2017/0175774 A1 * 6/2017 Yang ................... F04D 25/0606
2017/0296020 A1 * 10/2017 Chen ......................... A47L 9/00
2017/0366054 A1 * 12/2017 Li ............................ H02K 1/17
2018/0023580 A1 * 1/2018 Ishizaki ................... H02K 5/20 417/368
2019/0028005 A1 * 1/2019 Ishizaki ................... H02K 3/32
2019/0131751 A1 * 5/2019 McCurry ............... H02K 5/225
2020/0119616 A1 * 4/2020 Ludwig ..................... F01P 5/04

FOREIGN PATENT DOCUMENTS

JP S61164439 A * 1/1986
TW 201818637 A 5/2018

OTHER PUBLICATIONS

Search Report appended to an Office Action, which was issued to Taiwanese counterpart application No. 107120823 by the TIPO dated Nov. 5, 2019 with an English translation thereof.
Search Report appended to an Office Action, which was issued to Chinese counterpart application No. 201910978083.4 by the CNIPA dated Oct. 26, 2020 with an English translation thereof.

* cited by examiner

CEILING FAN MOTOR HOUSING WITH L-SHAPED POSITIONING MEMBER WITH HORIZONTAL PORTION TO SUPPORT BOTTOM END OF COVER

FIELD

The disclosure relates to a motor housing, and more particularly to a ceiling fan motor housing.

BACKGROUND

A conventional ceiling fan motor housing, such as one disclosed in U.S. Pat. No. 9,995,315, includes a bottom cover member and a hollow housing member.

The cover member has a horizontal bottom surface, a top surface, and a peripheral surface that interconnects an outer periphery of the bottom surface and an outer periphery of the top surface, and that surrounds a rotating axis which extends in the up-down direction. The peripheral surface is formed with a plurality of angularly equidistant fixing holes. The housing member has a top housing wall, and a peripheral housing wall that extends downwardly from the top housing wall and that is formed with a plurality of angularly equidistant positioning holes. To fasten the cover member onto the housing member, a plurality of fixing members respectively extend through the positioning holes to respectively engage the fixing holes.

However, as the positioning holes and the fixing holes are formed on uneven surfaces, manufacturing processes that involve drilling and tapping for the ceiling fan motor housing tend to become more cumbersome. Since high precision is required for such manufacturing process, the positioning holes and the fixing holes could be potentially misaligned during the assembling process.

SUMMARY

Therefore, an object of the disclosure is to provide a ceiling fan motor housing that can alleviate the drawback of the prior art.

According to the disclosure, the ceiling fan motor housing includes a bottom cover member, a hollow housing member, and a plurality of screws. The bottom cover member includes a horizontal bottom surface, a top surface, a peripheral surface, and a plurality of threaded holes. The peripheral interconnects an outer periphery of the bottom surface and an outer periphery of the top surface and surrounds a rotating axis which extends in an up-down direction. The threaded holes are formed in the bottom surface.

The housing member includes a top housing wall, a peripheral housing wall, and a plurality of L-shaped positioning members. The peripheral housing wall extends downwardly from the top housing wall, surrounds the axis, and has an inner surrounding surface which faces the peripheral surface of the bottom cover member, and a bottom end which surrounds the bottom cover. Each of the positioning members has a vertical portion which is connected to the bottom end, and a horizontal portion which extends inwardly from a bottom end of the vertical portion, supports the bottom cover member thereon, and is formed with a positioning hole.

The screws respectively extend through the positioning holes of the positioning members of the housing member to respectively engage the threaded holes in the bottom surface of the bottom cover member.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
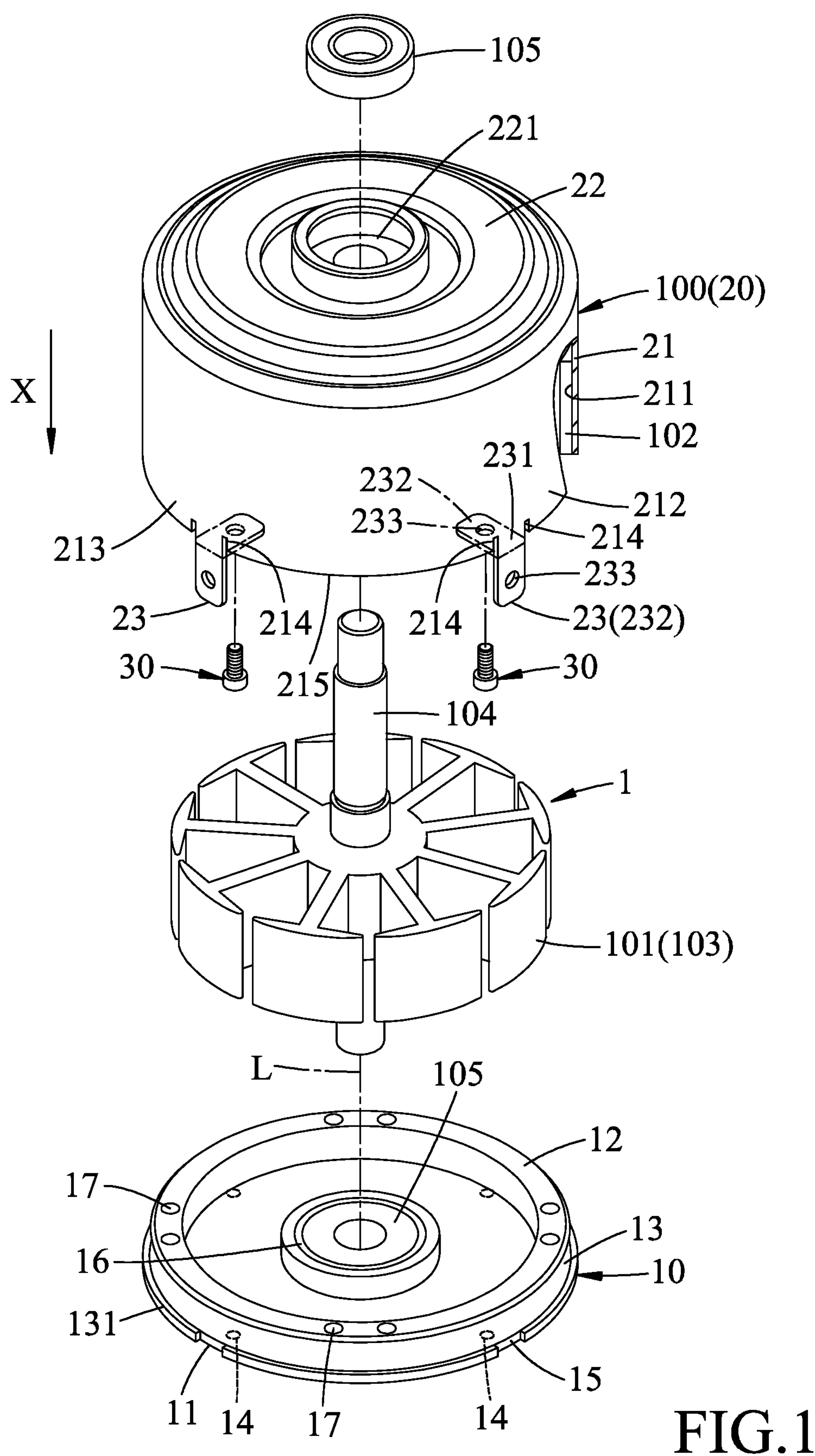
FIG. 1 is an exploded perspective view of an embodiment of a ceiling fan motor housing according to the disclosure.
Figure 2:
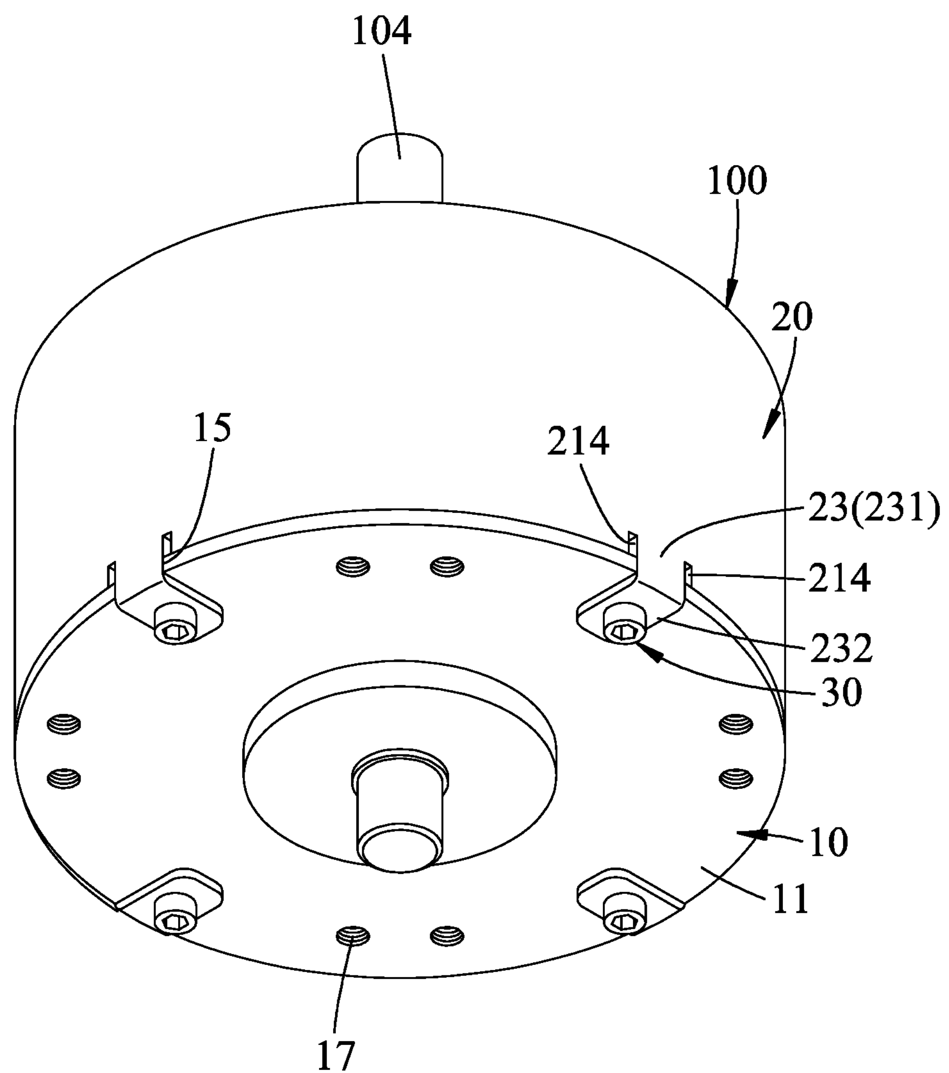
FIG. 2 is an assembled perspective view of the embodiment.
Figure 3:
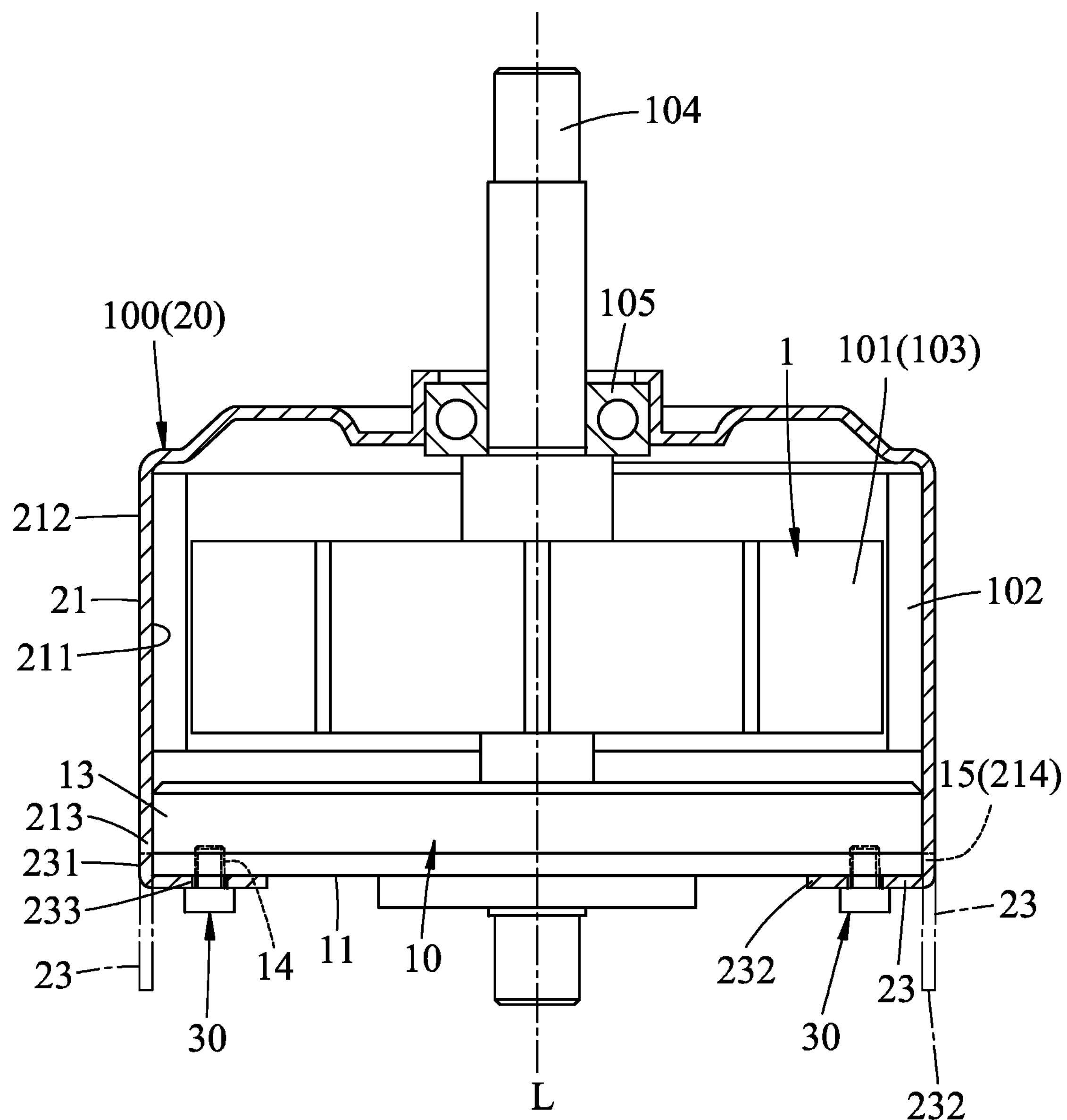
FIG. 3 is a schematic sectional view of the embodiment.

Referring to FIGS. 1 to 3, an embodiment of a ceiling fan motor housing 100 according to the disclosure is adapted to house a ceiling fan motor 1 therein. The motor 1 includes a stator 101 and a rotor 102 surrounding the stator 101. The stator 101 has a stator body 103, a stator shaft 104 that extends along an rotating axis (L) which extends in an up-down direction (X) and that is connected to the stator body 103, and two bearings 105 that are rotatably engaged with the stator shaft 104. The ceiling fan motor housing 100 includes a bottom cover member 10, a hollow housing member 20, and a plurality of screws 30 for fixing the bottom cover member 10 to the housing member 20.

The bottom cover member 10 is disc-shaped, and includes a horizontal bottom surface 11, a top surface 12, a peripheral surface 13 interconnecting an outer periphery of the bottom surface 11 and an outer periphery of the top surface 12 and surrounding the rotating axis (L), a plurality of angularly equidistant ribs 131 extending outwardly from a bottom end portion of the peripheral surface 13, a plurality of threaded holes 14 formed in the bottom surface 11, a lower shaft hole 16 extending along the rotating axis (L) and through the bottom and top surfaces 11, 12, and four pairs of fixing holes 17 that extend through the bottom surface 12 and the top surface 11 for mounting with four fan blades (not shown), respectively. Any two of the ribs 131 cooperatively define a positioning groove 15 therebetween. In this embodiment, the threaded holes 14 are angularly spaced apart and surround the rotating axis (L). The lower shaft hole 16 is adapted to fittingly engage one of the bearings 105 therein, thereby allowing the stator shaft 104 to rotatably extend therethrough.

The housing member 20 includes a top housing wall 22, a peripheral housing wall 21 that extends downwardly from the top housing wall 22, and a plurality of L-shaped positioning members 23. The peripheral housing wall 21 surrounds the axis (L), and has an inner surrounding surface 211 that faces the peripheral surface of the bottom cover member 10 and that is for the rotor 102 to be mounted thereon, an outer surrounding surface 212 that is opposite to the inner surrounding surface 211, and a bottom end 213 that has a bottom end surface 215 interconnecting bottom ends of the inner and outer surrounding surface 211, 212. The top housing wall 22 has an upper shaft hole 221 adapted for fittingly engaging the other one of the bearings 105 therein, thereby allowing the stator shaft 104 to rotatably extend therethrough. Each of the positioning members 23 has a vertical portion 231 that is connected to the bottom end 213, and a horizontal portion 232 that extends inwardly from a bottom end of the vertical portion 231, and that is formed with a positioning hole 233. In this embodiment, the positioning members 23 are angularly spaced apart.

The peripheral housing wall 21 further has a plurality of vertical slit pairs 214 that are formed in the bottom end surface 215, that extend through the inner and outer surrounding surfaces 211, 212, and that respectively correspond to the positioning members 23. Each of the slit pairs includes two vertical slits 214 that flank the vertical portion 231 of a corresponding one of the positioning members 23.

The following paragraphs elaborate the assembly of the ceiling fan motor housing 100 onto the motor 1:

Referring back to FIG. 1, before each of the components of the ceiling fan motor housing 100 is assembled, the horizontal portion 232 of each of the positioning members 23 of the housing member 20 extends in the same direction as the vertical portion 231 (as shown in solid lines in FIG. 1, and in imaginary lines in FIG. 3), thereby allowing the motor 1 to be housed within housing member 20, and the top ends of the ribs 131 to abut against the bottom end 213 of the peripheral housing wall 21 of the housing member 20. Before the horizontal portion 232 of each of the positioning members 23 is bent inwardly to form the L-shaped, the horizontal portion 232 is drilled to form the positioning hole 233 thereon.

Referring back to FIGS. 2 and 3, to house the motor 1 into the ceiling fan motor housing 100, the stator shaft 104 of the stator 101 is moved to extend though the upper shaft hole 221 of the housing member 20 to thereby align the stator body 103 with the rotors 102 mounted on the inner surrounding surface 211 of the housing member 20 beforehand. Then, the bearings 105 are respectively sleeved on two opposite ends of the stator shaft 104 at locations that respectively correspond to the upper and lower shaft holes 221, 16, thereby allowing the housing member 20 to smoothly rotate relative to the stator 101.

To assemble the bottom cover member 10 with the housing member 20, each of the positioning members 23 is moved to extend through a respective one of the positioning grooves 15 of the bottom cover member 10 until the bottom end 213 of the peripheral housing wall 21 of the housing member 20 abuts against the top ends of the ribs 131 of the cover member 10 and surrounds the bottom cover member 10. Thereafter, the horizontal portion 232 of each of the positioning members 23 is bent inwardly, forming the L-shape (as shown in imaginary line in FIG. 1, and in solid line in FIGS. 2 and 3) to support the bottom cover member 10 thereon and to align each of the positioning holes 233 with a corresponding one of the threaded holes 14. Lastly, the screws 30 are moved to respectively extend through the positioning holes 233 of the positioning members 23 of the housing member 20 to respectively engage the threaded holes 14 in the bottom surface 11 of the bottom cover member 10, thereby fixing the bottom cover member 10 to the housing member 20, and positioning the ceiling fan motor housing 100 relative to the motor 1.

Overall, the ceiling fan motor housing 100 has the following benefits:

1. The drilling process to form the threaded holes 14 on the bottom cover member 10 becomes simpler, since the threaded holes 14 are designed to be in the same planar surface.

2. Inclusion of the vertical slits 214 in the peripheral wall 21 of housing member 20 allows the positioning members 23 to be easily displaced for aligning the positioning holes 233 with the threaded holes 14, respectively. As such, the location in which the positioning holes 233 are formed does not have to be precise.

3. The formation of the positioning grooves 15 allows the positioning members 23 to respectively extend therethrough, preventing unintentional shifting when attempting to insert the screws 30 through the positioning holes 233 to engage the threaded holes 14.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A ceiling fan motor housing comprising:

a bottom cover member that includes a horizontal bottom surface, a top surface, a peripheral surface interconnecting an outer periphery of said bottom surface and an outer periphery of said top surface and surrounding a rotating axis (L) which extends in an up-down direction (X), and a plurality of threaded holes formed in said bottom surface;

a hollow housing member that includes a top housing wall, a peripheral housing wall extending downwardly from said top housing wall, surrounding the axis (L), and having an inner surrounding surface which faces said peripheral surface of said bottom cover member, and a bottom end which surrounds said bottom cover member, and a plurality of L-shaped positioning members, each of said positioning members having a vertical portion which is connected to said bottom end, and a horizontal portion which extends inwardly from a bottom end of said vertical portion, supports said bottom cover member thereon, and is formed with a positioning hole; and a plurality of screws that respectively extend through said positioning holes of said positioning members of said housing member to respectively engage said threaded holes in said bottom surface of said bottom cover member;

wherein said peripheral surface of said bottom cover member has a plurality of angularly equidistant ribs extending outwardly from a bottom end portion thereof, any adjacent two of said ribs cooperatively defining a positioning groove therebetween;

wherein said bottom end abuts against top ends of said ribs; and wherein said vertical portion of each of said positioning members extends through a respective one of said positioning groove.

2. A ceiling fan motor housing comprising:

a bottom cover member that includes a horizontal bottom surface, a top surface, a peripheral surface interconnecting an outer periphery of said bottom surface and an outer periphery of said top surface and surrounding a rotating axis (L) which extends in an up-down direction (X), and a plurality of threaded holes formed in said bottom surface;

a hollow housing member that includes a top housing wall, a peripheral housing wall extending downwardly from said top housing wall, surrounding the axis (L), and having an inner surrounding surface which faces said peripheral surface of said bottom cover member, and a bottom end which surrounds said bottom cover member, and a plurality of L-shaped positioning members, each of said positioning members having a vertical portion which is connected to said bottom end, and a horizontal portion which extends inwardly from a bottom end of said vertical portion, supports said bottom cover member thereon, and is formed with a positioning hole; and a plurality of screws that respectively extend through said positioning holes of said positioning members of said housing member to respectively engage said threaded holes in said bottom surface of said bottom cover member;

wherein said peripheral housing wall of said housing member further has an outer surrounding surface that is opposite to said inner surrounding surface;

wherein said bottom end of said peripheral housing wall has a bottom end surface that interconnects bottom ends of said inner and outer surrounding surfaces; and wherein said peripheral housing wall further has a plurality of vertical slit pairs that are formed in said bottom end surface, that extend through said inner and outer surrounding surfaces, and that respectively correspond to said positioning members, each of said slit pairs including two vertical slits that flank said vertical portion of a corresponding one of said positioning members.

* * * * *